C. N. PAYNE.
SPEED CHANGING DEVICE.
APPLICATION FILED MAY 22, 1906.

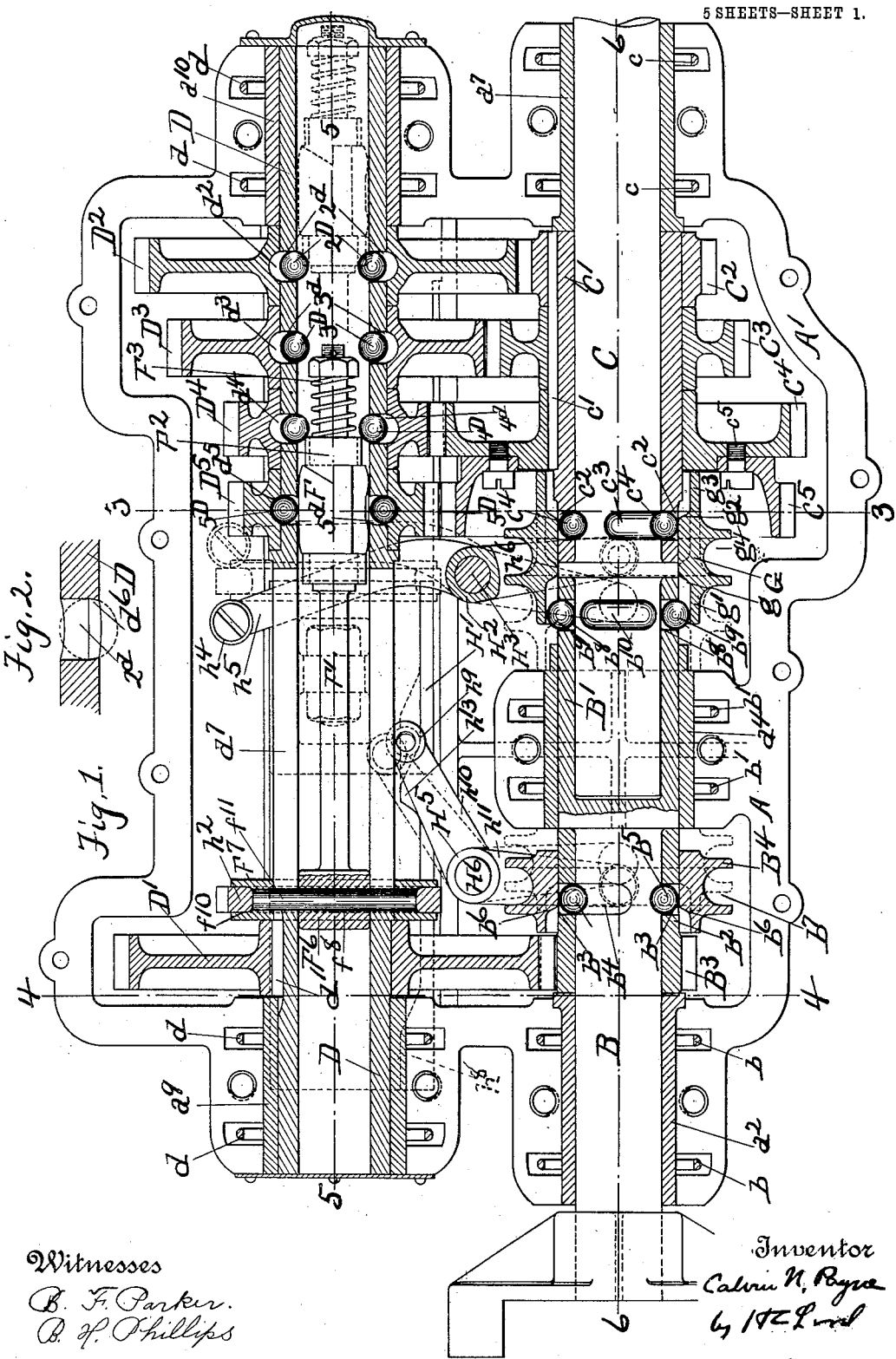

929,977.

Patented Aug. 3, 1909.
5 SHEETS—SHEET 2.

Witnesses
B. F. Parker.
B. H. Phillips.

Inventor
Calvin N. Payne
by H. L. Lord
Attorney

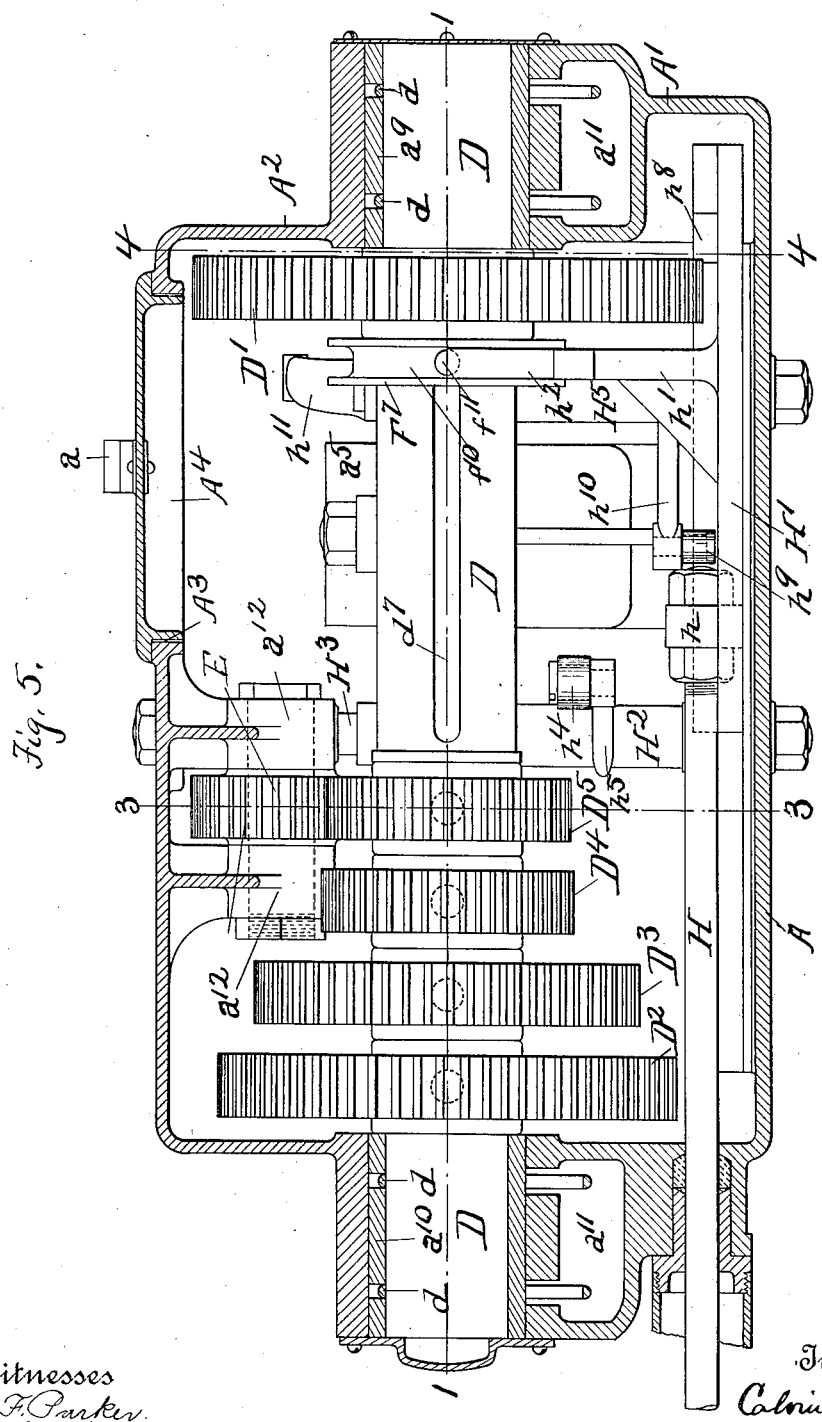

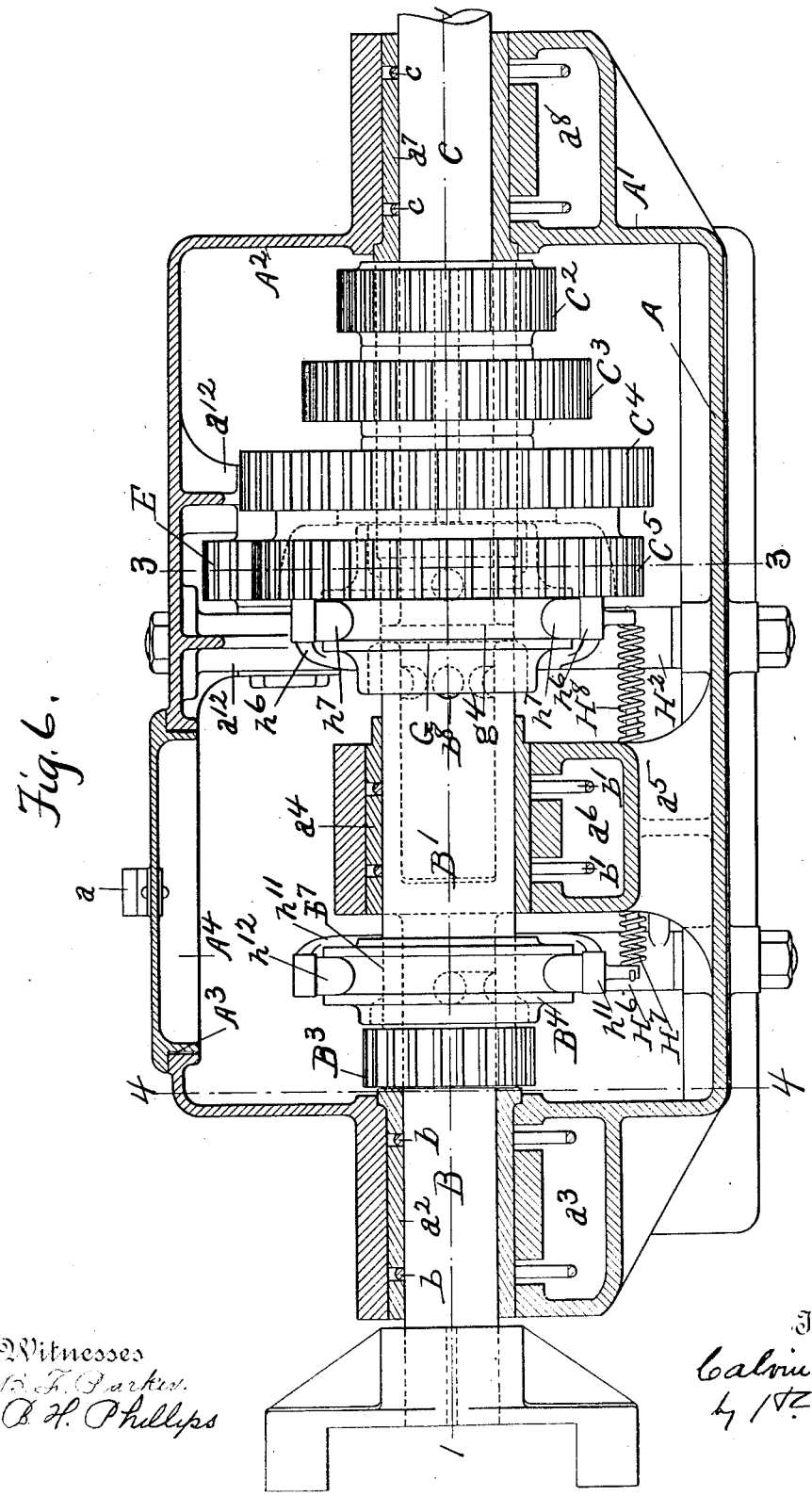

C. N. PAYNE.
SPEED CHANGING DEVICE.
APPLICATION FILED MAY 22, 1906.
929,977.
Patented Aug. 3, 1909.
5 SHEETS—SHEET 5.
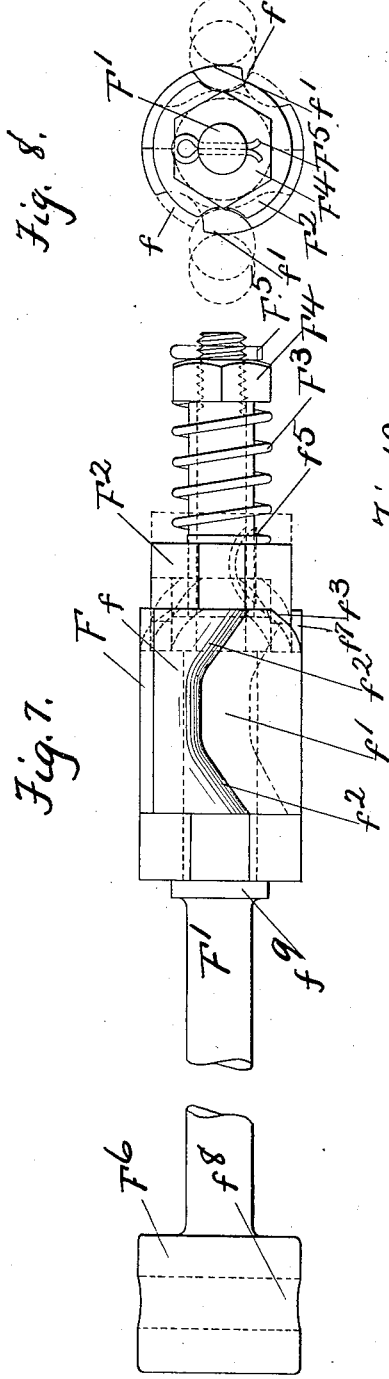
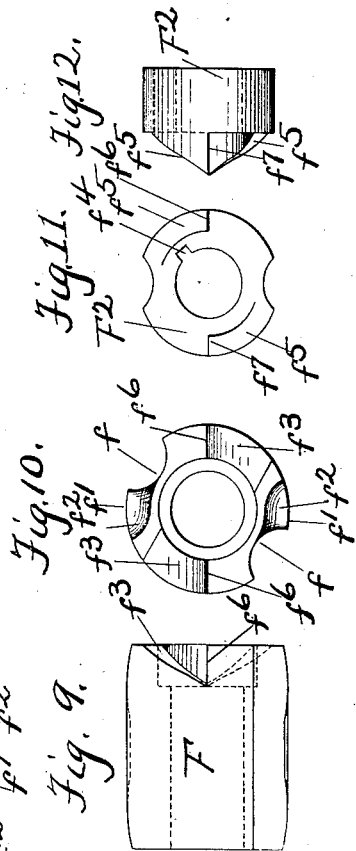

UNITED STATES PATENT OFFICE.

CALVIN N. PAYNE, OF TITUSVILLE, PENNSYLVANIA, ASSIGNOR TO MODERN TOOL COMPANY, OF ERIE, PENNSYLVANIA, A CORPORATION OF PENNSYLVANIA.

SPEED-CHANGING DEVICE.

No. 929,977.   Specification of Letters Patent.   Patented Aug. 3, 1909.

Application filed May 22, 1906. Serial No. 318,276.

*To all whom it may concern:*

Be it known that I, CALVIN N. PAYNE, a citizen of the United States, residing at Titusville, in the county of Crawford and State of Pennsylvania, have invented new and useful Improvements in Speed-Changing Devices, of which the following is a specification.

This invention relates to speed changing devices and consists in certain improvements in the construction thereof as will be hereinafter fully described and pointed out in the claims.

This invention is particularly adapted to speed changing devices used with automobiles and is shown as designed for this use.

Among the important features of the invention are devices through which various speeds may be brought into action through the continuous movement of the controlling mechanism in one direction. Mechanism for each speed may be coupled up or released by the movement of the controlling mechanism either to the next higher speed or next lower speed and the movement of the controlling mechanism in either direction automatically releases the mechanism just previously in action.

The device also contains mechanism adapted to be thrown into and out of action by the same controlling mechanism for directly connecting the driving and driven shaft and when so connected, the remaining mechanism is thrown entirely out of action automatically.

Other features of the construction will appear from the specification and claims.

Figure 3:
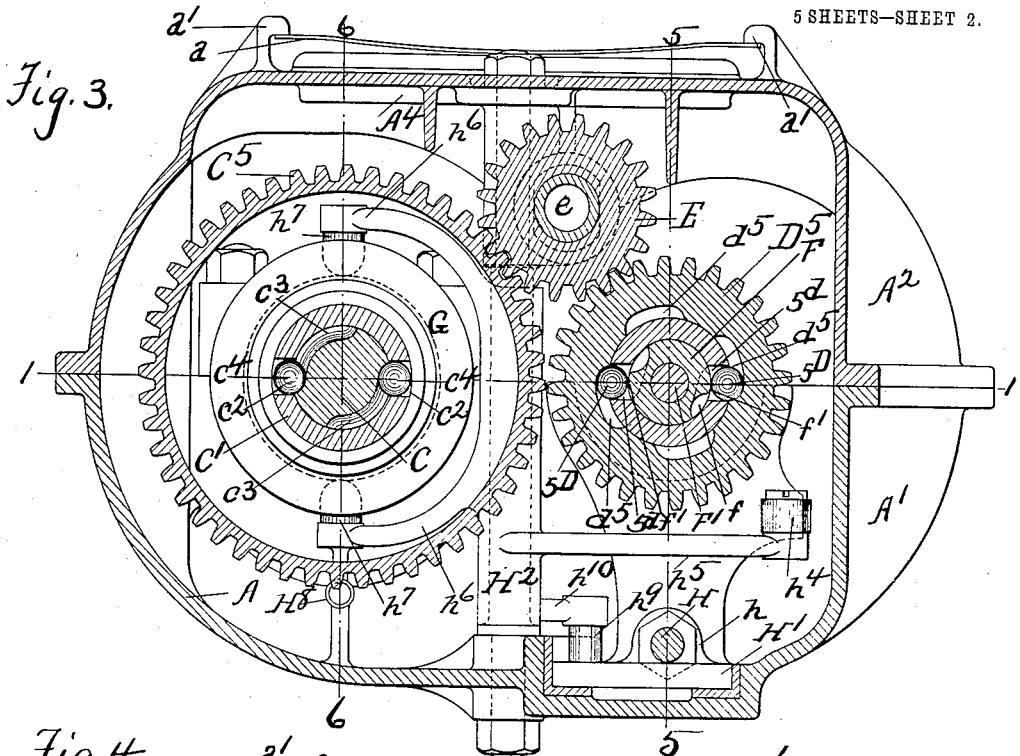
Figure 4:
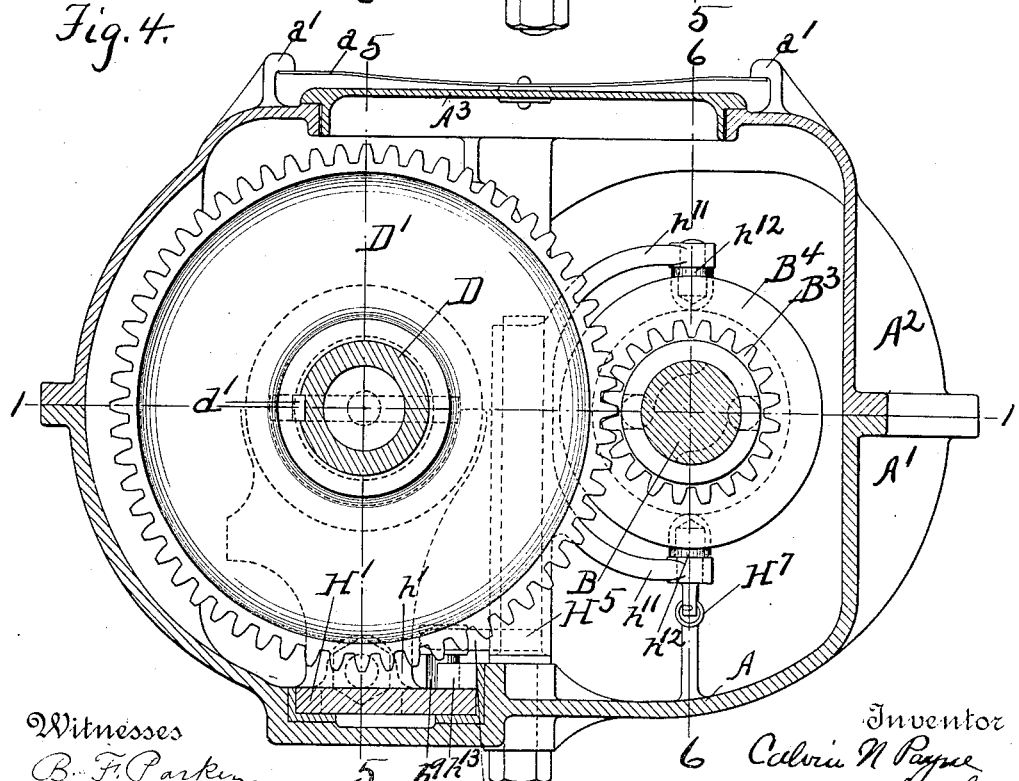

The invention is illustrated in the accompanying drawings as follows:

Figure 1 is a section on the line 1—1 in Figs. 3, 4, 5 and 6. Fig. 2 is a fragment of the transmission shaft with a ball opening therein. Fig. 3, is a section on the line 3—3 in Figs. 1, 5 and 6, the view being from the right of Figs. 1 and 6 and left of Fig. 5. Fig. 4 is a section on the line 4—4 in Figs. 5 and 6, the view being from the left of Figs. 1 and 6 and the right of Fig. 5. Fig. 5, is a section on the line 5—5 in Figs. 1, 3 and 4, the view being from the top of Fig. 1 and the left of Fig. 3 and the right of Fig. 4. Fig. 6 is a section on the line 6—6 in Figs. 1, 3 and 4, the view being from the bottom of Fig. 1, from the left of Fig. 3 and from the right of Fig. 4. Fig. 7 is an enlarged view of part of the controlling mechanism. Fig. 8 is an end view of the same mechanism. Fig. 9, an enlarged elevation of the ball actuating device of the controlling mechanism. Fig. 10, an end view of the same device. Fig. 11 is an end view of a cam block for actuating the ball actuating device. Fig. 12, a side elevation of the same block.

The device is preferably arranged in an oil tight case A, so that a lubricant may be used freely with the device, and at the same time be thoroughly protected from dust. This case forms the frame for the speed changing device and is preferably formed of two parts, A' and $A^2$ secured together. It is provided with an opening $A^3$ which is provided with a cover $A^4$. This cover is secured in place by the swinging spring bar $a$. This is arranged to swing and be sprung under the shoulder $d'$ on the frame so as to securely fasten the cover in place.

The driving shaft B is journaled in the bearing $a^2$ and $a^4$. The bearing $a^2$ is arranged in the case and the bearing $a^4$ is arranged in post $a^5$. The lubricating rings $b$—$b$ are arranged on the shaft B and extend into a cavity under the bearings $a^2$. These rings operate in the manner common to lubricating rings. Rings $b'$—$b'$ are arranged similarly on the bearing $a^4$ and extend into the cavity $a^6$ beneath the bearing.

The driven shaft C is arranged in line with the shaft B, one end of the shaft being journaled in the bearing $a^7$ secured in the frame or case A. This bearing is provided with the lubricating rings $c$—$c$ which extend into the oil cavity $a^8$ beneath the bearing. The other end of the driven shaft C extends into a sleeve-like extension B' on the end of the driving shaft, and this extension B' forms one of the bearings for the driven shaft C.

The transmission shaft D is parallel to the driving and driven shafts and is mounted in the bearings $a^9$ and $a^{10}$ in the case. These bearings are provided with lubricating rings $d$ which extend into the oil cavities $a^{11}$. The transmission shaft is driven through the action of the gears $B^3$ and D'. The gear $B^3$ is provided with a sleeve like hub $b^2$. Ball openings $b^3$ are arranged in this hub and ball sockets $b^4$ are provided in the shaft B and so located as to be brought into register with the sockets $b^3$. Balls $b^5$ are arranged in the ball openings $b^3$. A cam ring $B^4$ having the cam surface $b^6$ is slidingly mounted on the hub $b^2$. The balls $b^5$ are of greater diameter than the thickness of the hub so that when the sleeve $B^4$ is forced toward the left as shown in Fig. 1, part of the balls are forced through the openings $b^3$ and extend into the sockets $b^4$ and thus lock the hub and gear $B^3$ with the driving shaft B. The gear $D'$ is locked with the transmission shaft by means of the key $d'$. The transmission shaft is preferably provided with a series of different sized gears $D^2$, $D^3$ and $D^4$ and a reverse gear $D^5$. Their bores are provided with the ball sockets $d^2$, $d^3$, $d^4$, and $d^5$. The transmission shaft is hollow or in the form of a sleeve and has ball openings $2^d$, $3^d$, $4^d$, and $5^d$. These openings are so located as to come into register with the sockets $d^2$, $d^3$, $d^4$, and $d^5$ as the transmission shaft is rotated. Balls $2^D$, $3^D$, $4^D$ and $5^D$ are arranged in the openings $d^2$, $d^3$, $d^4$ and $d^5$, respectively and are adapted to be forced into said sockets for locking the gears with the transmission shaft. In Fig. 2, I have shown an enlarged view of one of these ball openings. It has the contracted end $d^6$ which is of slightly less diameter than that of the balls. This construction permits the balls to project through the openings sufficiently to clear the transmission gears and at the same time retain the balls in the openings when out of action. The gears $D^2$, $D^3$ and $D^4$ mesh the gears $C^2$, $C^3$ and $C^4$ on the driven shaft. These gears are locked with the driven shaft by a mechanism hereinafter described. The reverse gear $D^5$ meshes an intermediate gear E and this intermediate gear meshes a gear $C^5$, the gear $C^5$ being secured to the gear $C^4$ by means of the screw $c^5$. The gear E is mounted on a pin $e$ (see Figs. 3 and 5) and this pin is carried by the bracket $a^{12}$ extending from the wall of the frame. (See Figs. 3, 5 and 6.) The interposing of the intermediate gear E between the gears $D^5$ and $C^5$ reverses the direction of the movement of the driven shaft from what it is when driven from the other transmission gears.

It will readily be understood that as the balls $2^D$, $3^D$, $4^D$, and $5^D$ are forced out into the sockets in the transmission gears, they lock these gears with the transmission shaft. It will also be readily understood that no two should be locked with the transmission shaft at the same time.

In the operation of devices of this kind, it is desirable to throw in by a continuous movement of the controlling mechanism the various speeds successively from the lowest to the highest and vice versa. In the mechanism shown, the ball actuating device F of the controlling mechanism is arranged within the transmission shaft. This ball actuating device is rotatively mounted on a rod $F'$, and is provided with a cam $f'$. This cam has the two beveled cam surfaces $f^2$ one at each end of the device. As the device is moved along the transmission shaft, it forces the balls controlling the engagement between the shaft and the transmission gears outwardly. The device is of sufficient length to only force one set of balls into engagement at a time and as it passes by, it releases this set of balls before forcing a second set of balls in position to lock a gear with the shaft. The ordinary neutral position is between the reverse gear $D^5$ and the lowest speed gear $D^4$. As it moves from this position, it first forces the balls $4^D$ into locking position. If a higher speed is desired, a further movement will release these balls and force the balls $3^D$ into locking position. One of the desirable features of the invention is that the number of gears may be increased indefinitely without materially changing the mechanism.

It sometimes happens that the mechanism is brought to a stop and it is desirable to be able to move the ball actuating device to a different speed or to a different position before starting the mechanism. For this purpose, the ball actuating device F has the grooves $f$. These are of sufficient depth to permit of the passage of the ball actuating device F past the balls acting on the transmission gears, when this groove is brought into alinement with the balls. This can be done by rotating the device F so as to bring the grooves $f$ into line with the balls. I prefer to have this ball actuating device F rotated through the action of the balls themselves upon it, when the balls are locked in their inward position with the mechanism stationary. To accomplish this I provide the front end of the ball actuating device with the annular cams $f^3$. These engage the cams $f^4$ on a cam block $F^2$. The cam block is slidingly mounted on the shaft $F'$, but is locked against rotative movement thereon by the key $f^5$. A spring $F^3$ forces the cam block toward the ball actuating device F. This spring is tensioned against the nut $F^4$ arranged on the end of the shaft, the nut being locked against engagement by the cotter pin $F^5$. The shoulder $f^6$ prevents an endwise movement of the ball actuating device F under the influence of the spring. At the ends of the cams $f^3$ are the shoulders $f^6$ and at the ends of the cams $f^5$ are the opposing shoulders $f^7$. As the ball actuating device is moved along the transmission shaft, beveled surfaces $f^2$ of the cam $F'$ engage the balls successively. If a socket in the gear is in register with the ball openings, the ball is forced out into the socket, and rests on the comparatively flat surface of the cam $f'$. If, however, the ball is held locked in its inner position by reason of the fact that the sockets are not in register, then the balls acting upon the beveled surfaces $f^2$ of the cams $f'$ turn the ball actuating device F on the rod F' so as to bring the groove $f$ into line with the balls and permit the passage of the ball actuating device past the balls. In this way, the ball actuating device may be moved from end to end of its travel with the parts stationary, whether or not the balls are in register with the sockets or not. These yielding cams also perform a useful function even when the mechanism is in action, in that it permits of the immediate movement of the ball actuating device to the desired position even though the ball sockets are not for the moment in register with the ball openings at the desired position, and as soon as the sockets do move into register with the ball openings, the balls are forced into the sockets by the action of the springs operating through the cams $f^3$ and $f^5$. The ball actuating device is shown in dotted lines in Figs. 7 and 8 as having been rotated to permit of its movement past the balls. In order to make the ball actuating device operate properly, the rod F' should be locked against rotative movement. I provide the rod with the shoulder $F^6$ having a perforation $f^8$. A pin $f^{10}$ is arranged in the perforation $f^8$ and through a slot $d^7$ extending axially along the shaft D. Movement is communicated to the rod F' through this pin by means hereinafter described.

It is desirable as an added speed variation as well as a means for reducing the friction of the parts, to be able to couple the driving shaft directly with the driven shaft, and the efficiency of the device is increased, if, when the driving shaft is connected directly with the driven shaft, the mechanism connected with the transmission shaft is thrown out of action. It is also desirable to have this accomplished with the same controlling mechanism that is used to throw in the different speeds through the transmission shaft and to have the mechanism so arranged that the direct connection between the driving and driven shaft will be in proper sequence to one of the speeds (ordinarily the highest) through the transmission gears. In the mechanism shown, this is accomplished in a simple but effective manner. The clutch for coupling the driving shaft directly with the driven shaft comprises the ball openings $b^8$ in the extension B'. Ball sockets $b^{10}$ are arranged on the driven shaft in position to be brought into register with these ball openings. Balls $b^9$ are arranged in the openings. A ball actuating ring G is slidingly mounted on the extension B' and the sleeve C' on the driven shaft. It has the ball actuating cam $g$ and the ball retaining lip $g'$. When this sleeve is moved toward the left as shown in dotted lines in Fig. 1, the balls $b^9$ are forced inwardly, into the sockets $b^{10}$, thus locking the driving and driven shafts together. It is manifest that prior to the time the driving and driven shafts are locked together, that the connection between the driving and driven shafts through the transmission gears must be thrown out. This may be done by so positioning the controlling mechanism with relation to the ball actuating device F as to have the ball actuating device in such neutral position at the time the sleeve G is in position to lock the clutch between the driving and driven shaft. I prefer, however, not only to be able to lock the driving and driven shafts together but at the same time to entirely throw out of action all the gears of the transmission mechanism. The driven shaft gears $C^2$ $C^3$ etc., are mounted on the sleeve C'. They are locked against rotation upon said sleeve by means of the key $c'$. A clutch for locking this sleeve and consequently the gears with the driven shaft C comprises the ball openings $c^2$ in the sleeve C', the ball sockets $c^3$ in the driven shaft in position to be brought into register with the said ball openings; the balls $c^4$ in said openings, the balls being of such diameter with relation to the sleeve as to be forced into the socket by the action of the sleeve G upon them. This action on the balls is facilitated by the cam surface $g^2$ on the sleeve G and the ball is retained in the opening by means of the retaining lip $g^3$. The space between the cams $g$ and $g^2$ is such that before the cam $g$ forces the balls $b^9$ into locking position, the cam $g^2$ has passed the ball openings $c^2$ so as to release the clutch between the sleeve C' and the driven shaft, and on the return movement, the clutch between the extension B' and the driven shaft is released prior to the locking of the sleeve C' with said driven shaft. It will be noted that as soon as the clutch between the sleeve C' and the driven shaft is released, this driven shaft simply rotates in the sleeve C', thus permitting the driven shaft gears $C^2$, $C^3$, etc., to remain stationary. It is desirable also to throw out the gears $B^3$ and D' so that the transmission shaft itself may remain stationary when the driving shaft is connected directly with the driven shaft. This is accomplished by means of clutches controlled by the sleeve $B^4$ heretofore described.

Controlling mechanism for accomplishing the movement of the sleeves G and $B^4$ in proper sequence in relation to the action of the transmission gears is as follows. A rod H extends without the case and may be readily manipulated or attached to any desired operating mechanism (not shown). This rod extends through a lug $h$ on a slide H' and is secured to this lug by means of nuts, one at each side of the lug. A bracket $h'$ extends from the slide H' and has the forked end $h^2$. This forked end enters a groove $f^{10}$ in a sliding collar $F^7$ arranged on the transmission shaft, and the pin $f^{11}$, heretofore described extends into this sliding collar $F^7$ so that a movement of the collar communicates movement to the rod $F'$ and consequently to the ball actuating device. The slide $H'$ is moved through the action of the rod H. As the bracket $H'$ approaches the extreme end of its travel, toward the left as viewed in Fig. 5, it contacts the roller $h^4$. The roller $h^4$ is carried by a lever $h^5$ and this lever is mounted on the sleeve $H^2$. The sleeve $H^2$ is rotatively mounted on the pin $H^3$, the pin $H^3$ extending across the case, and is secured to the walls thereof. The forked lever $h^6$ extends from the sleeve $H^2$ and the roller pin $h^7$ extends from this lever into the groove $g^4$ in the sleeve G. The parts are so proportioned relatively to each other that when the ball actuating device F reaches a position to force the balls $D^2$ into locking position, the sliding collar $F^7$ is in position to contact the roller $h^4$. A further movement of the slide and consequently the ball actuating device carries the parts to the position shown in dotted lines in Fig. 1; that is, the ball actuating device is moved to a position to release the gear $D^2$ and to move the sleeve G to a position locking the driving shaft directly with the driven shaft and to release the sleeve $C'$ from the driven shaft. When the slide H is moved from the extreme position, to bring the sliding collar into contact with the roller $h^4$, a cam $h^8$ on the slide is brought into contact with a roller $h^9$. This roller is carried by a lever $h^{10}$. The lever extends from a sleeve $H^5$. The sleeve $H^5$ is rotatively mounted on a stud or pin $H^6$. This stud or pin is secured to the wall of the case. The forked lever $h^{11}$ extends from the sleeve and roller pins $h^{12}$ extend from the forked lever into the groove $b^7$ of the sleeve $B^4$. This cam $h^8$ forces the lever to the position shown in dotted lines in Fig. 1, when the forked lever $h^6$ and the ball actuating device F are in the position shown in dotted lines in Fig. 1. In other words, with the controlling device moved to its extreme position as indicated in the dotted lines, the gear $B^3$ is released from the driving shaft and the sleeve $C'$ is released from the driven shaft and the driving shaft is locked directly with the driven shaft. With the initial return movement of the controlling mechanism, the driving shaft is released from the driven shaft. The driven shaft is connected with the sleeve $C'$ and consequently the driven shaft gears. The gear $B^3$ is connected with the driving shaft and the return movement of the ball actuating device throws the transmission gears successively into engagement, graduating the speed from one to the other. The slide $B^4$ is positively moved as the controlling mechanism approaches the extreme position through the action of the cam $h^8$. This is feasible because this movement of the lever simply releases the clutch. On the return movement the lever $h^{11}$ is actuated by a spring $H^7$. This permits of an unimpeded movement of the controlling mechanism, when the ball sockets are out of register with the ball openings. The lever will follow as soon as the ball sockets are brought into register with the ball openings. In regard to the lever $h^6$, this is positively moved as the controlling mechanism approaches its extreme position as shown in the dotted lines and the lever is returned by the spring $H^8$.

It is desirable to throw out the transmission shaft when the controlling mechanism is brought to a neutral point; that is, a point between the low speed gear and the reverse. To accomplish this, I arrange the second cam $h^{13}$ on the slide H in the path of the roller $h^9$. When the controlling mechanism is moved to the neutral position, the ball actuating device F is between the ball openings $d^4$ and $d^5$. The cam $h^{13}$ acts upon the roller $h^9$ and throws the lever $h^6$ and with it the lever $h^{11}$ to a position carrying the slide $B^4$ out of locking position so as to release the clutch between the gear $B^3$ and the driving shaft, so that with the controlling device in a neutral position, the driving shaft may revolve without actuating any of the gears.

What I claim as new is:

1. In a speed changing device the combination of a driving shaft; a transmission shaft; a gear connection between the driving shaft and the transmission shaft; a driven shaft in alinement with the driving shaft; a plurality of gears on the driven shaft; a clutch for locking said gears with said driven shaft; a series of gears on the transmission shaft, said gears being arranged to give to the driven shaft at least two different speeds in the same direction with the given speed of the transmission shaft; a clutch between the driving shaft and the driven shaft; and means for throwing out the clutch between the driven shaft and the driving shaft.

2. In a speed changing device the combination of a driven shaft; a transmission shaft parallel to the driven shaft, one of said shafts being hollow and having ball openings therein; balls arranged in said openings; a series of gears on the shaft having said openings, said gears having clutch sockets therein arranged in the path of the ball openings; a ball actuated device in the hollow shaft, said ball actuated device being rotatively mounted and arranged when in one position to force the balls into clutch position, and when turned to another position to move past the balls with the speed changing device stationary; gears on the other of said shafts; a driving shaft in alinement with the driven shaft; and a gear connection between the driving shaft and the transmission shaft.

3. In a speed changing device the combination of two shafts parallel to each other, one of said shafts being hollow and having ball openings therein, said shaft also having an axial slot through which movement may be communicated to a ball actuating device; a series of gears on each of the shafts meshing the gears on the other of said shafts, the gears on the hollow shaft having clutch sockets therein arranged in the path of the ball openings; and balls arranged in said openings, said ball actuating device in the hollow shaft; controlling devices for operating said ball actuating device, said devices being arranged to operate through the slots in said shaft.

4. In a speed changing device the combination of two shafts parallel to each other, one of said shafts being hollow and having ball openings therein, said shaft also having an axial slot through which movement may be communicated to the ball actuating device; a series of gears on each of the shafts meshing the gears on the other of said shafts, the gears on the hollow shaft having clutch sockets therein arranged in the path of the ball openings; balls arranged in said openings; the rod F' arranged in the hollow shaft; said ball actuating device rotatively mounted on said rod and arranged when in one position to force the balls into clutch position and when turned to another position to permit of its passage past the balls with the balls in release position; a pin for locking the rod F' against rotation and extending through said slot in the hollow shaft; and means for actuating the said pin to actuate the ball device.

5. In a speed changing device the combination of two shafts parallel to each other, one of said shafts being hollow and having ball openings therein, said shaft also having an axial slot through which movement may be communicated to the ball actuating device; a series of gears on each of the shafts meshing the gears on the other of said shafts, the gears on the hollow shaft having clutch sockets therein arranged in the path of the ball openings; balls arranged in said openings; the rod F' arranged in the hollow shaft; said ball actuating device rotatively mounted on said rod and arranged when in one position to force the balls into clutch position and when turned to another position to permit of its passage past the balls with the balls in released position; a pin for locking the rod F' against rotation and extending through the said slot in the hollow shaft; and means for actuating the said pin to actuate the ball device; and a spring tensioned between said rod and the ball actuating device for yieldingly holding the ball actuating device in position to force the balls into engagement.

6. In a speed changing device the combination of two shafts parallel to each other, one of said shafts being hollow and having ball openings therein, said shaft also having an axial slot through which movement may be communicated to the ball actuating device; a series of gears on each of the shafts meshing the gears on the other of said shafts, the gears on the hollow shaft having clutch sockets therein arranged in the path of the ball openings; balls arranged in said openings; the rod F' arranged in the hollow shaft and said ball actuating device rotatively mounted on said rod and arranged when in one position to force the balls into clutch position and when turned to another position to permit of its passage past the balls with the balls in released position; a pin for locking the rod F' against rotation and extending through the said slot in the hollow shaft; means for actuating said pin to actuate the ball device; a spring tensioned between said rod and the ball actuating device for yieldingly holding the ball actuating device in position to force the balls into engagement, said ball actuating device being adapted to force a ball into engagement when a socket comes into register through the action of the spring if the ball actuating device is moved to a position to actuate said ball while the socket is out of register with the ball opening.

7. In a speed changing device, the combination of a transmission shaft; a series of gears on said shaft; devices for locking said gears successively with said shaft; a driving and driven shaft arranged in alinement; a gear connection between the transmission shaft and one of said shafts; a clutch for said gear connection; a series of gears on the other of said shafts; a clutch for locking said gears with said shaft; a clutch between said driving and driven shafts; the slide H' having the bracket $h'$; means for actuating two of the clutches arranged in the path of the bracket $h'$; and a cam $h^8$ for actuating the other of said clutches.

8. In a speed changing device the combination of a transmission shaft; a series of gears on said shaft; devices for locking said gears successively with said shaft; a driving and driven shaft arranged in alinement; a clutch between the driving and driven shafts; a gear connection between the transmission shaft and one of said shafts; a clutch for said gear connection; a series of gears on the other of said alined shafts; a clutch for locking said gears with said shaft; a sliding collar $F^7$ for actuating said devices, said collar having a groove therein; the slide H' having a forked bracket engaging the collar; a rock arm $h^5$ for actuating the clutch between the driving and driven shafts arranged in the path of said bracket and adapted to be actuated at the extremity of the travel of the devices and after the highest speed gear has been thrown into and out of action; the rock lever $h^{10}$ for actuating the clutches controlling the gear connection; the cam $h^8$ on the slide H' for actuating said rock lever at the extremity of the travel of the slide; and a cam $h^{13}$ for actuating the rock arm $h^{10}$ to release the clutch controlling the gear connection when said devices are at a neutral point.

9. In a speed changing device the combination of a transmission shaft; a series of gears on said shaft; devices for locking said gears on said shaft comprising a collar $F^7$; a driving shaft and driven shaft in alinement; a series of gears in mesh with the gears of the transmission shaft arranged on one of said alined shafts; a gear connection between the transmission shaft and the other alined shaft; a clutch for locking said gears on the said shaft; a rock lever for actuating said clutch; a clutch for locking the driving and driven shafts together, actuated by the same rock lever; and an actuating slide, said rock lever being in the path of said slide and adapted to be actuated thereby.

10. In a speed changing device the combination of a transmission shaft; a series of gears on said shaft; devices for locking said gears on said shaft comprising a collar $F^7$; a driving shaft and a driven shaft in alinement; a series of gears in mesh with the gears on the transmission shaft arranged on one of said alined shafts; a clutch for locking said gears on the said shaft; a gear connection between the other of the said alined shafts and the transmission shaft; a clutch for controlling said gear connection; a rock lever for actuating said clutch; a slide; and a cam on the slide for actuating the rock lever.

11. In a speed changing device the combination of two shafts arranged in parallel relation to each other, one of said shafts being hollow and having ball openings therein, said ball openings being contracted at their inner ends; a series of gears on each of said shafts, the gears on the hollow shaft having clutch sockets adapted to be brought into register with the ball openings; balls in said openings adapted to be forced into said sockets for locking the gears with the shaft, said balls being of a diameter larger than the contracted ends of the openings so as to be retained in the openings and to be in position to permit of the turning of the gear on the shaft when the balls are in contact with the contracted ends; and a controlling mechanism arranged within the shaft for forcing said balls into engagement.

12. In a speed changing device the combination of a case in which the device is arranged; a driving shaft and driven shaft arranged in alinement and journaled in said case, the driving shaft having the sleeve-like extension $b'$ in which the driven shaft is journaled; the hollow transmission shaft D having ball openings and the slot $d^7$ therein; a series of gears on the transmission shaft having ball sockets therein adapted to be brought into register with the ball openings; a sleeve C' on the driven shaft; a series of gears fixed on said sleeve; a gear $B^3$ on the driving shaft; a gear D' fixed on the transmission shaft; a clutch between the gear $B^3$ and the driving shaft; a ball clutch between the driven and driving shaft; a ball clutch between the driven shaft and the sleeve C'; the sleeve G controlling the clutch between the driving and driven shafts and the driven shaft and the sleeve C'; the sleeve $B^4$ controlling the clutch between the driving shaft and the gear $B^3$; a ball actuating device arranged in the hollow shaft; a collar in said shaft; a pin extending from said collar through the slot in said shaft for communicating movement to the ball actuating device; rock levers for actuating the collar $B^4$; a rock lever for operating the collar G; the slide H' having a bracket engaging the collar $F^7$; a cam engaging the rock lever controlling the collar $B^4$; and a part on the slide arranged in the path of the rock lever controlling the collar G.

13. In a speed changing device the combination of a transmission shaft; a driving and driven shaft arranged in alinement; a gear on the driving shaft for communicating movement from the driving shaft to the transmission shaft; a gear on the driven shaft; clutches for locking said gears with said shafts; gears on the transmission shaft in mesh with the gears on the driving and driven shafts; a clutch for locking said driving and driven shafts together; the pin $H^3$; the sleeve $H^2$ journaled on said pin; a forked lever $h^{11}$ on said sleeve; a collar controlling the clutch between said gear and the driving shaft actuated by said forked lever; a pin secured to the case; a sleeve $H^5$ journaled on said pin; a forked lever $h^{11}$ carried by the sleeve; a collar G controlling the clutch between the driving and driven shafts and the clutch for locking the gear on the driven shaft actuated by said forked lever; the lever $h^5$ on the sleeve $H^2$; the lever $h^{10}$ on the sleeve $H^5$; and a slide for actuating the levers $h^5$ and $h^{10}$.

In testimony whereof I have hereunto set my hand in the presence of two subscribing witnesses.

CALVIN N. PAYNE.

Witnesses:
Wm. V. Miller,
James S. O'Brien.